United States Patent [19]

Kempter et al.

[11] 4,189,450

[45] Feb. 19, 1980

[54] SURFACE-COATING BINDERS AND THEIR USE FOR CATHODIC ELECTROCOATING

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[21] Appl. No.: 969,554

[22] Filed: Dec. 14, 1978

[30] Foreign Application Priority Data

Dec. 15, 1977 [DE] Fed. Rep. of Germany ....... 2755906

[51] Int. Cl.² .................... C08L 63/00; C25D 13/06
[52] U.S. Cl. .................... 525/455; 260/292 EP; 260/293; 204/181 C; 525/529
[58] Field of Search ........................ 260/831

[56] References Cited

U.S. PATENT DOCUMENTS

| | | | |
|---|---|---|---|
| 3,462,237 | 8/1969 | Sellet | 260/831 |
| 3,790,606 | 2/1974 | Sellet | 260/831 |
| 3,994,989 | 11/1976 | Kempter | 260/831 |
| 4,014,955 | 3/1977 | Renner | 260/831 |
| 4,018,847 | 4/1977 | Messerly | 260/831 |
| 4,086,292 | 4/1978 | Kempter | 260/831 |
| 4,134,932 | 1/1979 | Kempter | 260/831 |

FOREIGN PATENT DOCUMENTS

| | | | |
|---|---|---|---|
| 2357075 | 5/1975 | Fed. Rep. of Germany | 260/831 |
| 2711385 | 9/1978 | Fed. Rep. of Germany | |
| 1457932 | 12/1976 | United Kingdom | |

*Primary Examiner*—Paul Lieberman
*Attorney, Agent, or Firm*—Keil & Witherspoon

[57] ABSTRACT

Surface-coating binders and their use. The binders are reaction products of (A) Mannich bases obtained from one or more condensed phenols, free from ether groups, which contain two or more phenolic hydroxyl groups per molecule, one or more butadiene or isoprene homopolymers or copolymers which contain one or more

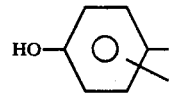

groups per molecule and have a mean molecular weight of from 500 to 6,000, one or more secondary amines which contain one or more hydroxyalkyl groups per molecule, or a mixture of such secondary amines with another secondary amine, and formaldehyde or a formaldehyde donor, with (B) one or more epoxy resins. These surface-coating binders are used especially for the cathodic electrocoating of metal articles.

11 Claims, No Drawings

SURFACE-COATING BINDERS AND THEIR USE FOR CATHODIC ELECTROCOATING

The present invention relates to surface-coating binders which have been obtained by reacting a Mannich base with an epoxy resin, and to their use, in their water-dilutable form obtained by protonization with an acid, as cationic electrocoating binders.

A plurality of cationic electrocoating binder systems has already been proposed, for example in German Laid-Open Applications DOS Nos. 2,033,770, 2,163,143, 2,057,799, 1,930,949 and 2,252,536, which give good results in respect of, for example, corrosion protection or throwing power, but are not satisfactory as far as the totality of binder characteristics is concerned.

An important shortcoming of the conventional systems is, inter alia, that they cannot be processed at the pH range of from 7 to 9 employed for anodic electrocoating (cf. also "Electrodeposition of Coatings", Advances in Chemistry Series 119, pages 110 to 127, American Chemical Society, Washington 1973 and Industrial Finishing, 49 (1973), No. 8, 18–23).

A further disadvantage is that the crosslinking reactions which these systems are stated to undergo do not suit the desired pH range, and that the stability of the bath is no more than moderate, which at times necessitates maintaining a low bath temperature, for example <25° C., which in turn requires greater expenditures on cooling.

German Laid-Open Applications DOS Nos. 2,320,301, 2,357,075, 2,419,179 and 2,554,080 describe cationic electrocoating binders which inter alia are distinguished by providing very good corrosion protection, and which can be deposited at an alkaline pH, above 7. They are reaction products of Mannich bases, obtained from condensed phenols, secondary amines and formaldehyde, with epoxy resins.

A disadvantage of these binders is that they cannot in every case be processed directly with the pigments and fillers conventionally used in the production of surface coatings, and instead the pigments and fillers must be treated with a suitable wetting agent in a preceding step.

It is an object of the present invention to provide surface-coating binders, and in particular cationic electrocoating binders, which exhibit substantial improvements over the prior art and the properties of which, especially in respect of the ability to wet pigments and fillers, conform to requirements.

We have found that this object is achieved by providing a surface-coating binder, substantially free from epoxide groups, which has been obtained by reacting (A) a Mannich base obtained from ($a_1$) one or more condensed phenols, free from ether groups, which contain two or more phenolic hydroxyl groups per molecule, ($a_2$) one or more butadiene or isoprene homopolymers or copolymers which contain one or more

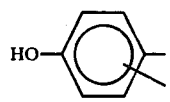

groups per molecule and have a mean molecular weight of from 500 to 6,000, ($a_3$) one or more secondary amines which contain one or more hydroxyalkyl groups per molecule, or a mixture of such secondary amines with another secondary amine, and ($a_4$) formaldehyde or a formaldehyde donor, with (B) one or more epoxy resins.

Particularly preferred surface-coating binders are those where component ($a_2$) is a reaction product which has been obtained from a butadiene homopolymer or copolymer, having a mean molecular weight of from 500 to 6,000, preferably a polybutadiene oil containing 1,2-double bonds, and a polynuclear phenol of the general formula

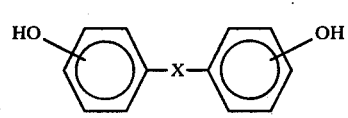

where the hydroxyl groups are in the ortho- and/or para-position to X, and X is a straight-chain or branched divalent aliphatic radical of 2 to 8 carbon atoms, in the presence of an acid catalyst, as well as those which have been obtained by reacting from 40 to 90% by weight of component (A) with from 10 to 60% by weight of component (B).

It is particularly advantageous to protonize the surface-coating binders of the invention with an acid in the conventional manner.

The invention further relates to the use of the surface-coating binders according to the invention, in their protonized form, for the cathodic electrocoating of electrically conductive surfaces.

A particular advantage of the cationic electrocoating binders of the invention is that for electrophoretic use in the conventional manner they need only be protonized with particularly small amounts of an acid, for example preferably acetic acid (from 1.0 to 2.0% by weight, based on solid resin), in order to give stable dispersions or colloidal dispersions having the preferred pH of from 7.0 to 10.0.

An additional special advantage of the surface-coating films produced from the binders according to the invention is their solvent resistance, great hardness and resilience, and excellent corrosion protection afforded on sheet iron pretreated with zinc and iron phosphate (for example ®Bonder 125, 1040 from Metallgesellschaft).

A further surprising advantage of the surface-coating binders of the invention, which contain olefinic double bonds, is the good wetting properties of the binders when milled with pigments or fillers, especially the good properties of the protonized binders in an aqueous medium, and the good compatibility of the binders with, for example, liquid polydiene resins, such as those described in German Patent Application P 26 36 797.5. In addition, the binders of the invention exhibit particularly well-balanced deposition characteristics on a plurality of different metals and differently pretreated metals.

The following details may be noted in respect of the components used to produce the electrocoating binders of the invention:

(A) Preparation of the Mannich base ($a_1$) Suitable condensed phenols free from ether groups and containing two or more phenolic hydroxyl groups per molecule are polyhydric phenols which contain one or more aromatic radicals, preferably bisphenol A or novolacs.

Particularly suitable components (a₁) are phenols of the general formula

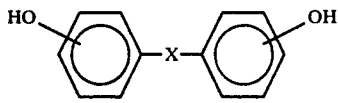

where the OH groups are in the ortho- and/or para-position to X, and X is a straight-chain or branched divalent aliphatic radical of 1 to 3 carbon atoms or is >SO₂, >SO, >C=O or —O—; the use of bisphenol A is preferred. The alkyl derivatives of the above condensed phenols are also suitable.

Another suitable component (a₁) for the preparation of the surface-coating binders of the invention is a Mannich condensation product of one or more phenols and/or alkylphenols, a primary amine and formaldehyde or a formaldehyde donor, as described in German Patent Application No. P 27 11 385.5.

Suitable phenols for the preparation of these Mannich condensation products are phenol and alkylphenols, preferably monoalkylphenols of 1 to 18, especially of 3 to 12, carbon atoms in the straight-chain, branched or cyclic alkyl radical, eg. hexylphenol, nonylphenol, dodecylphenol, tert.-butylphenol and phenylphenol. Nonylphenol (also including, for example, technical-grade nonylphenol containing 85% of 4-nonylphenol) and p-tert.-butylphenol, and mixtures of these alkylphenols with phenol, are preferred. 3-Alkylenephenols, for example Cardanol, obtainable from cashewnut-shell oil, may also be used. A part of the unsubstituted phenol can also be replaced by bisphenol A. Suitable primary amines are monoalkylamines of 2 to 13, preferably of 2 to 6, carbon atoms in the straight-chain, branched or cyclic alkyl radical, eg. butylamine, hexylamine and octylamine, as well as hydroxy-substituted and alkoxy-substituted monoalkylamines, eg. monoethanolamine and monoisopropanolamine, 2-alkoxyethylamines, eg. 2-methoxyethylamine and 2-ethoxyethylamine, and mixtures of the said amines.

To prepare these Mannich condensation products, which can be used as component (a₁), the phenol or alkylphenol, primary amine and formaldehyde or formaldehyde donor are reacted with one another, advantageously in such amounts as to provide at least 1 mole of the primary amine per 2 moles of phenol or alkylphenol, these amounts corresponding to a minimum of 2 moles of formaldehyde.

Other suitable components (a₁) are indan derivatives containing phenol groups, as described in U.S. Pat. No. 2,979,534, for example

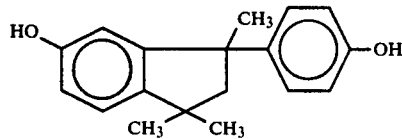

(a₂) Component (a₂) used according to the invention is a butadiene or isoprene homopolymer or copolymer which contains one or more

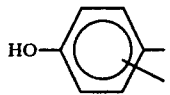

groups per molecule and has a mean molecular weight of from 500 to 6,000.

Such products are advantageously obtained by reacting a butadiene or isoprene homopolymer or copolymer with a polynuclear phenol of the general formula

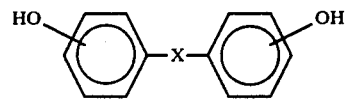

where X is a straight-chain or branched divalent aliphatic radical of 2 to 8 carbon atoms, in the presence of an acid catalyst, for example a sulfonic acid, eg. p-toluenesulfonic acid, or a Lewis acid, at from 150° to 250° C., preferably from 160° to 190° C.

Suitable polymers for the preparation of component (a₂) are polybutadiene, polyisoprene, copolymers of butadiene, for example copolymers with styrene which contain at least 50% by weight of butadiene as copolymerized units, and, preferably, polybutadiene oils which contain 1,2-double bonds and may or may not additionally contain 1,4-double bonds. The mean molecular weight of the preferred polybutadiene oils is from 600 to 6,000, especially from 900 to 3,000. The content of 1,2- and 1,4-double bonds in these polybutadiene oils may vary within wide limits. Examples include polybutadiene oils containing from 20 to 40% of 1,2-double bonds and from 60 to 80% of 1,4-double bonds, with from about 40 to 50% of trans-structure and from about 20 to 30% of cis-structure, or polybutadiene oils containing from 40 to 50% of 1,2-double bonds and from 50 to 60% of 1,4-double bonds, with from 15 to 25% of trans-structure, from 10 to 20% of cis-structure and from 15 to 20% of cyclic structure, or polybutadiene oils containing about 20% of 1,2-double bonds and about 80% of 1,4-double bonds, with about 60% of trans-structure and about 20% of cis-structure, as well as polybutadiene oils containing more than 90% of 1,2-double bonds and fewer than 10% of 1,4-double bonds. Polybutadiene oils which contain other functional groups, for example OH groups, may also be used.

In the reaction of the polybutadiene oils, containing 1,2-double bonds, with polyhydric phenols of the above formula, using an acid catalyst, it is to be assumed that

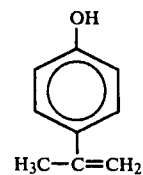

occurs as an intermediate.

The phenol formed during the reaction is removed by distillation but can also be re-used for a fresh reaction, for example a fresh condensation to give bisphenol A, or a reaction such as those in German Patent Application No. P 27 11 385.5, described above.

The polybutadiene oils are in general reacted with the polynuclear phenols of the stated formula in a molar ratio of from 1:0.2 to 1:8, preferably from 1:0.5 to 1:3. Particularly preferred components ($a_2$) are reaction products of a polybutadiene oil with bisphenol A.

The component ($a_2$) containing phenol groups can also be modified, after its preparation, by a further reaction such as thermal polymerization and/or cyclization. This further reaction in the presence or absence of oxygen is advantageously carried out at from 120° to 200° C.

The softening point or softening range of component ($a_2$) can vary within relatively wide limits. Corresponding to the preferred softening points of from 25° to 100° C., the phenolic derivatives ($a_2$) are substances which are viscous to solid at room temperature.

Even small amounts of an acid catalyst (from 0.02 to 0.5% by weight, preferably from 0.04 to 0.25% by weight, based on the total batch) suffice for the preparation of component ($a_2$). This makes subsequent removal of the catalyst superfluous, since the stated amount of catalyst, if present during the preparation or processing of the binder according to the invention, has no effect on the properties.

Component ($a_2$) in most cases contains small proportions of phenol or bisphenol (less than 10%) after distillation. In general, however, it is not necessary to remove these residual amounts by steam distillation.

Further suitable components ($a_2$) are the reaction products of epoxide-containing oils and/or polybutadiene oils with phenols and/or polynuclear phenols, eg. bisphenol. However, these products differ from those described above in that they contain a substantial number of ether groups. Component ($a_2$) contains olefinic double bonds.

($a_3$) Examples of suitable secondary amines ($a_3$) which contain one or more hydroxyalkyl groups are alkylethanolamines or alkylisopropanolamines, where alkyl is of 1 to 6 carbon atoms. However, dialkanolamines, especially diethanolamine, and mixtures of these alkanolamines or dialkanolamines with other secondary amines, are preferred.

The secondary amines ($a_3$) which are present in the structure of the Mannich base (A) as diethanolaminomethyl groups and alkylethanolaminomethyl groups are of substantial importance in determining the degree of dispersibility of the binder in the desired pH range of from 6.0 to 10.0, and in determining the crosslinking of the system.

Suitable secondary alkylamines which may or may not be employed together with the hydroxyalkyl-containing amines in preparing the Mannich bases (A) are those of the general formula

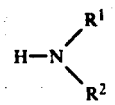

where $R^1$ and $R^2$ are identical or different and each is a straight-chain or branched aliphatic radical of 1 to 14 carbon atoms which may or may not contain an alkoxy group. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, eg. di-2-methoxy-, di-2-ethoxy- and di-2-butoxy-ethylamine, as well as secondary amines where $R^1$ and $R^2$ are linked to form a ring, eg. morpholine and piperidine.

Amongst these secondary amines which may or may not be present, di-n-butylamine, di-n-hexylamine, di-n-octylamine, di-2-ethylhexylamine and di-2-alkoxyethylamines, and their mixtures, are preferred. The mode of action of these secondary amines ($a_3$) is predominantly that they influence the stability characteristics of the binders; they also contribute to the levelling and internal plasticization of the surface coatings prepared from the binders.

The secondary amines ($a_3$) may, inter alia due to their method of preparation, also contain a proportion of the corresponding primary amines, but in general this proportion should not exceed 10% by weight of the secondary amine.

($a_4$) The formaldehyde or formaldehyde donor is preferably used as a solution in alcohol, eg. a solution of formaldehyde in butanol, or as paraformaldehyde, or as mixtures of these.

The Mannich bases (A) are prepared in accordance with the conventional methods described in the literature, for example in Houben-Weyl, Methoden der organischen Chemie, volume XI/1 (1957), 731. The choice of solvent is made to suit the different polarity conditions. It is advantageous to use higher alcohols, cycloaliphatics or alkylaromatics in addition to more polar solvents.

The ratios of the starting materials employed depend on the particular properties desired, but the weight ratio of component ($a_1$) to component ($a_2$) can be from 1:0.05 to 1:6, preferably from 1:0.3 to 1:3 and the weight ratio of the secondary hydroxyl-containing amines to the other secondary alkylamines can be from 3:1 to 1:3.

To prepare the Mannich base (A), the ratios of the starting materials ($a_1$), ($a_2$) and ($a_3$) are advantageously selected so as to provide from about 0.3 to 2.0, preferably from 0.5 to 1.5, moles of component ($a_3$) per equivalent of phenolic hydroxyl groups of the mixture of components ($a_1$) and ($a_2$).

The amount of ($a_4$) to be employed in preparing the Mannich base (A) is at least 1 mole per mole of ($a_3$).

The properties of the electrocoating bath, and of the coating obtained, can be varied according to choice by varying the ratios of the secondary amines. The dispersibility of the binder, the reactivity, the flow properties, the crosslinking, the resilience and the corrosion protection can be varied by selection of the ratio of diethanolamine or alkylethanolamine and di-n-butylamine, di-n-hexylamine, di-2-ethylhexylamine, di-n-octylamine and di-2-alkoxyethylamine.

In a particularly preferred embodiment of the present invention, the Mannich bases are prepared using a formaldehyde donor, for example paraformaldehyde, in an amount which is virtually equivalent to the proportion of amine used but in general does not exceed a 25% excess, in an alcohol, eg. isopropanol or isobutanol, and the component (A) is reacted directly, ie. without subsequent reaction with further formaldehyde, with component (B).

In general, the reaction of component (A) with component (B) is controlled so that the resulting novel binders have mean molecular weights of from 800 to 5,000, preferably from 1,000 to 3,000.

The reaction of component (A) with component (B) is in general carried out at from 20° to 100° C., preferably from 60° to 80° C., and preferably in an organic solvent, eg. an alcohol of 3 to 16 carbon atoms, a glycol ether or an alkylaromatic, eg. toluene and the like, or a cycloaliphatic.

However, the Mannich bases (A) can also be reacted with further formaldehyde, somewhat in the manner of forming a novolac, but the formaldehyde content should only be from 2.5 to 5.0% by weight based on the Mannich base (A), with a view to avoiding an excessive residual formaldehyde content of the binders.

To prepare the electrocoating binders according to the invention, the Mannich condensation product (A) is reacted in an amount of from 40 to 90% by weight, preferably from 50 to 90% by weight, with from 10 to 60% by weight, preferably from 10 to 50% by weight, of the epoxy resin (B); the degree of etherification of the phenolic components ($a_1$ and $a_2$) by the epoxy resin (B) can in particular be used to influence the stability characteristics, but also other important properties, eg. the breakdown strength. (B) Suitable epoxy resins are the conventional polyepoxide compounds, preferably polyepoxide compounds with 2 or 3 epoxide groups in the molecule, eg. reaction products of polyhydric phenols, especially those of the formula given under ($a_1$)

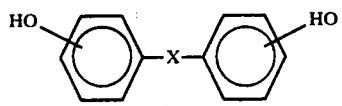

with epichlorohydrin, but also the reaction products of polyhydric alcohols, eg. pentaerythritol, trimethylolpropane or glycerol, with epichlorohydrin, referred to above. All diols or polyols which may or may not contain ether groups and which, after the introduction of the glycidyl radical, may still contain free OH groups or may be completely free from alcoholic OH groups, can be used. Reaction products, containing epoxide groups, of epoxy resins with secondary amines or with hydroxyl-containing glycol ethers may also be used, as may epoxy resins which contain hetero-atoms, eg. sulfur, in the molecular structure. The epoxy resins mentioned under ($a_2$) are also suitable, as are epoxy resins containing blocked urethane groups, such as those described in German Laid-Open Applications DOS Nos. 2,554,080 and 2,541,801. As an entirely general rule, all resins which contain 1,2-epoxide groups and are derived from polyacrylate, polyether, polyester and polyurethane resins, or from polybutadiene oils and other oils, may be used.

Other suitable resins containing epoxide groups are nitrogen-containing diepoxides, as described in U.S. Pat. No. 3,365,471, epoxy resins obtained from 1,1-methylene-bis-(5-substituted hydantoin) (U.S. Pat. No. 3,391,097), obtained from bis-imides (U.S. Pat. No. 3,450,711), epoxidized aminomethyldiphenyl oxides (U.S. Pat. No. 3,312,664), aliphatic and heterocyclic N,N'-diglycidyl compounds (for example as described in U.S. Pat. No. 3,503,979), aminoepoxyphosphonates (British Pat. No. 1,172,916), 1,3,5-triglycidylisocyanurates and other prior art materials which contain epoxide groups.

In order to ensure that component (B) possesses the higher functionality which is preferred for the formation of a resin from components (A) and (B), component (B) may be reacted with a diisocyanate, eg. hexamethylene diisocyanate or toluylene diisocyanate, or with a polyisocyanate. For example, an epoxide compound which contains one epoxide group but also contains other functional groups, eg. OH groups, can be reacted with a diisocyanate. The epoxy resins may or may not be reacted further with partially blocked diisocyanates and polyisocyanates.

It is essential that the binders according to the invention contain o-alkanolaminomethylphenol radicals, eg. o-diethanolaminomethylphenol radicals, with or without dialkylaminomethylphenol radicals.

It may be assumed that when reacting the Mannich base (A) with the epoxy resin (B), the main reaction which occurs is an autocatalyzed etherification of the phenolic hydroxyl groups by the epoxide groups.

The reaction product obtained according to the invention from components (A) and (B) is substantially free from epoxide groups and, at the state of its use, should not contain more than 0.5 epoxide group per molecule of reaction product. Where necessary, the excess epoxide groups present after preparation of the binder may be removed by means of mercaptans and/or acids.

Additives employed with the surface-coating binders of the invention may be the polybutadiene oils already referred to, or other hydrocarbon oils, as well as compounds containing blocked urethane groups, for example those described in German Patent Applications Nos. P 27 11 425.6 and P 27 55 907.5. The binders described in German Laid-Open Application DOS No. 2,606,831 may also be used as additives. The surface-coating binders of the invention, diluted with conventional surface-coating solvents, for example alcohols of 4 to 16 carbon atoms, eg. isopropanol, decanol, n-butanol or isobutanol, alkylaromatics, eg. toluene, cycloaliphatics or aqueous-organic solvents or solvent mixtures may be applied, with or without pigments, fillers and conventional assistants, onto the substrate to be coated or varnished, eg. wood, metal, glass or ceramic, by conventional coating methods, eg. spraying, dipping or flooding, after which the coating is dried and hardened at above 170° C. The resulting coatings are distinguished by, for example, great hardness and solvent resistance.

Preferably, however, the surface-coating binders of the invention are used after protonizing them with acids, for example phosphoric acid and its derivatives, or, preferably, water-soluble carboxylic acids, eg. acetic acid, formic acid or lactic acid. The protonized surface-coating binder is water-dilutable and can be processed using the conventional coating methods listed above, again giving coatings having very valuable properties. However, the degree of protonization should be kept very low.

The preferred use of the protonized surface-coating binders of the invention is the cathodic electrocoating of electrically conductive surfaces, eg. metal articles, sheets and the like consisting of brass, copper, aluminum, iron and steel, which may or may not be chemically pretreated, eg. phosphatized.

The aqueous solution or dispersion of a surface-coating binder according to the invention, which binder is at least in part in the form of a salt of a water-soluble carboxylic acid, can also contain, mixed with the binder, assistants which can be deposited electrochemically by cataphoresis, eg. pigments, soluble dyes, solvents, flow improvers, stabilizers, curing catalysts, antifoam agents and other assistants and additives.

The surface-coating binders according to the invention can be used both as the main carrier resin for electrocoating and as the carrier resin in the pigment paste. Alternatively, the resin can be used as the main carrier resin for the electrocoating composition, in combination with a conventional pigment paste. As a further alternative, the resin can be used as the carrier resin in a pigment paste, in combination with a conventional carrier resin, containing amine groups, for cathodic electrocoating. The cationic electrocoating resins containing amine groups are conventional products which do not require detailed description here. Examples of suitable resins include resins containing tertiary amine salt groups, as disclosed in German Laid-Open Application DOS No. 2,603,666, and resins containing quaternary ammonium salt groups, as described in U.S. Pat. No. 3,839,252.

For cathodic electrocoating, the electrocoating bath is in general brought to a solids content of from 5 to 20% by weight by dilution with deionized water. In general, coating is carried out at from 15° to 40° C. for from 1 to 2 minutes at a bath pH of from 6.0 to 10.2, preferably from 7.0 to 9.5, with a deposition voltage of from 50 to 500 volts. After rinsing the film cathodically coated onto the electrically conductive article, the film is hardened at about 160°–220° C. for from 10 to 30 minutes, preferably at 180°–200° C. for 20 minutes.

The binders of the invention, when used for cathodic electrocoating, give coatings having excellent mechanical properties, eg. great hardness and scratch resistance, coupled with very good resilience and firm adhesion to the substrate.

Further, the coatings obtained are distinguished by high resistance to solvents and to the salt spray test.

In the Examples, parts and percentages are by weight.

Preparation of the butadiene polymers ($a_2$) containing phenol groups:

($a_{2.1}$) 456 parts of bisphenol A and 250 parts of a polybutadiene oil containing more than 90% of 1,2-double bonds and having a molecular weight of about 1,100 are heated to 170° C. (under nitrogen), after which 1.4 parts of p-toluenesulfonic acid dissolved in 4 parts of ethylglycol are added. Since the reaction is exothermic, cooling is necessary to keep the temperature at from 180° to 190° C. Distillation under reduced pressure, to remove the phenol formed, is started when a sample of the reaction product remains clear after cooling on a glass plate. After the phenol has been removed virtually completely, the resin is diluted with 224 parts of isobutanol. The solids content is 70.7%.

($a_{2.2}$) Using a polybutadiene oil which contains from 40 to 50% of 1,2-double bonds and from 50 to 60% of 1,4-double bonds, of which latter from 15 to 25% have the cis-structure, from 15 to 25% the trans-structure and from 15 to 20% a cyclic structure, and which has a molecular weight of about 1,300, a binder containing phenol groups is prepared as described under ($a_{2.1}$); the temperature rise observed is less in the present case. After dilution with 224 parts of isobutanol, a resin solution having a solids content of 69.6% is obtained.

($a_{2.3}$) Using 304 parts of a polybutadiene oil which contains from 20 to 30% of 1,2-double bonds and from 70 to 80% of 1,4-double bonds, of which latter 20–30% have the cis-structure and 40–50% have the trans-structure, and which has a molecular weight of about 1,500, a binder containing phenol groups is prepared from 456 parts of bisphenol A as described under ($a_{2.1}$); again the exothermicity observed is less than in the case of ($a_{2.1}$). After dilution with 224 parts of isobutanol, a resin solution having a solids content of 69.6% is obtained. The iodine number is 200.

EXAMPLE 1

Preparation of the cationic electrocoating binder 140 parts of diethanolamine, 103 parts of di-n-butylamine, 194 parts of component ($a_{2.1}$), 170 parts of bisphenol A and 72.5 parts of paraformaldehyde in 107 parts of isobutanol are heated for 3 hours at 80° C. 150 parts of a diglycidyl ether based on bisphenol A, and having an epoxide value of 0.2, 277 parts of an about 80% strength solution, in isobutanol, of an epoxy resin containing urethane groups and prepared as described in Example Ba) of German Laid-Open Application DOS No. 2,541,801, and 60 parts of isobutanol are then added and the mixture is reacted for 5 hours at 70° C. The binder solution has a solids content of 74%.

To prepare 2 liters of a 10% strength electrocoating bath, 260 parts of the binder are protonized with 2.6 parts of 99% strength acetic acid and diluted with water. The pH is 8.3. After stirring for 2 days at 25° C. and adding 8 ml of isodecanol the bath is used at deposition voltages of from 300 to 360 V to coat zinc- and iron-phosphatized steel sheets for 2 minutes; after baking for 20 minutes at 180° C., smooth 15–16$\mu$ coatings are obtained.

EXAMPLE 2

125 parts of diethanolamine, 82.5 parts of di-n-butylamine 151.1 parts of bisphenol A, 198.5 parts of component ($a_{2.3}$), 72.5 parts of paraformaldehyde, 180 parts of isobutanol and 60 parts of toluene are heated for 3 hours at 80° C. 55 parts of isobutanol, 114 parts of a diglycidyl ether based on bisphenol A and having an epoxide value of 0.2, 60 parts of a glycidyl ether based on pentaerythritol and having an epoxide value of 0.59 and 250 parts of a 70% strength solution of an epoxy resin containing blocked isocyanate groups are added and the mixture is reacted for 5 hours at 70° C. The resulting binder according to the invention has a solids content of 74%.

The epoxy resin, containing blocked isocyanate groups, used for the last-mentioned reaction was prepared as follows:

516 parts of the above glycidyl ether, having an epoxide value of 0.2, and 129 parts of the above glycidyl ether having an epoxide value of 0.59, dissolved in 90 parts of methyl isobutyl ketone and 30 parts of toluene, are rendered anhydrous by distillation. 90 parts of anhydrous methyl isobutyl ketone are added to the virtually solvent-free resin mixture and the latter is then reacted for 2 hours at 80° C. with 518 parts of toluylene diisocyanate with one blocked isocyanate group in accordance with Example Ba) of German Laid-Open Application DOS No. 2,541,801. The product, which is free from isocyanate groups, is then diluted with 447 parts of ethylglycol; the mixture has a solids content of 70%.

135 parts of the binder according to the invention are protonized with 1.5% of 99% strength acetic acid and when diluted to 1 liter with fully deionized water give a 10% strength coating bath having a pH of 7.95.

On coating zinc- and iron-phosphatized substrates at 25° C. and 150 V for 2 minutes, the coatings obtained, when fully hardened (20 minutes at 180° C.), give smooth films 16–17$\mu$ thick.

The Konig pendulum hardness is 190, the Erichsen value is 8.3 mm and the impact test (measured with the Erichsen impact-drawing instrument) gives a value of 160 inch/pound of either side.

Examination of the corrosion resistance by the DIN 50,021 salt spray test gives the following results after 10 days:

On
- Bonder 125: 1-2 mm
- Bonder 127 WL: 2-3 mm
- Bonder 101 WL: 2-3 mm

We claim:

1. A surface-coating binder, substantially free from epoxide groups, which has been obtained by reacting (A) a Mannich base obtained from
   - ($a_1$) one or more condensed phenols, free from ether groups, which contain two or more phenolic hydroxyl groups per molecule,
   - ($a_2$) one or more butadiene or isoprene homopolymers or copolymers which contain one or more

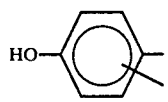

groups per molecule and have a mean molecular weight of from 500 to 6,000,
   - ($a_3$) one or more secondary amines which contain one or more hydroxyalkyl groups per molecule, or a mixture of such secondary amines with another secondary amine, and
   - ($a_4$) formaldehyde or a formaldehyde donor, with (B) one or more epoxy resins.

2. A surface-coating binder as claimed in claim 1, wherein component ($a_2$) is a product which has been obtained by reacting a polybutadiene oil with a polynuclear phenol in a ratio of from 1:0.2 to 1:8.

3. A surface-coating binder as claimed in claim 1, wherein component ($a_2$) is a reaction product of a butadiene homopolymer or copolymer, having a mean molecular weight of from 500 to 6,000, with a polynuclear phenol of the general formula

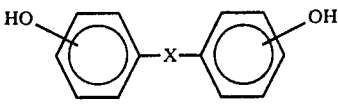

where the hydroxyl groups are in the ortho- and/or para-position to X, and X is a straight-chain or branched divalent aliphatic radical of 2 to 8 carbon atoms, the reaction product having been obtained in the presence of an acid catalyst.

4. A surface-coating binder as claimed in claim 1, which has been obtained by reacting from 40 to 90% by weight of component (A) with from 10 to 60% by weight of component (B) and which contains from 0 to 40% by weight of one or more other surface-coating binders.

5. A surface-coating binder as claimed in claim 1, wherein component ($a_3$) is diethanolamine or a mixture of diethanolamine and another secondary amine.

6. A surface-coating binder as claimed in claim 1, wherein component ($a_2$) is a reaction product of a polybutadiene oil, containing 1,2-double bonds, and bisphenol A.

7. A surface-coating binder as claimed in claim 1, wherein component (B) is an epoxy resin which contains blocked isocyanate groups.

8. A surface-coating binder as claimed in claim 1, wherein components ($a_1$) and ($a_2$) are employed in the ratio of from 1:0.05 to 1:6.

9. A surface-coating binder as claimed in claim 1, wherein the Mannich base (A) is a reaction product which has been prepared by using, per equivalent of phenolic hydroxyl groups of the mixture of components ($a_1$) and ($a_2$), from about 0.3 to 2.0 moles of component ($a_3$) and at least 1 mole of component ($a_4$) per mole of component ($a_3$).

10. A surface-coating binder as claimed in claim 1, which has been conventionally protonized with an acid.

11. A process for the cathodic electrocoating of electrically conductive surfaces using the surface-coating binder as claimed in claim 10.

* * * * *